United States Patent [19]

Kröger

[11] 4,256,014
[45] Mar. 17, 1981

[54] PISTON VIBRATOR

[75] Inventor: Dietrich Kröger, Breckenheim, Fed. Rep. of Germany

[73] Assignee: Grumag Geraete- und Maschinen GmbH, Rheinfelden, Switzerland

[21] Appl. No.: 9,354

[22] Filed: Feb. 5, 1979

Related U.S. Application Data

[63] Continuation of Ser. No. 832,505, Sep. 12, 1977, abandoned, which is a continuation of Ser. No. 631,063, Nov. 12, 1975, abandoned.

[51] Int. Cl.³ .......................... F01B 7/18; F01L 21/02; F01B 15/00
[52] U.S. Cl. ................................. 91/216 B; 91/234; 91/235; 198/768; 73/580
[58] Field of Search ............... 91/235, 234, 217, 216B; 92/117 R, 117 A, 118; 73/71.6; 198/768

[56] References Cited
U.S. PATENT DOCUMENTS

| 1,259,882 | 3/1918 | Lewis | 91/234 |
| 2,196,224 | 4/1940 | Morgan | 91/234 |
| 2,197,626 | 4/1940 | Scheven | 91/235 |
| 2,868,357 | 1/1959 | Thomas | 198/768 |
| 3,023,738 | 3/1962 | Burgess, Jr. | 91/234 |
| 3,376,790 | 4/1968 | Matson | 91/235 |

Primary Examiner—Paul E. Maslousky
Attorney, Agent, or Firm—Blanchard, Flynn, Thiel, Boutell & Tanis

[57] ABSTRACT

A piston vibrator comprising a cylindrical housing having a chamber with a free floating piston therein. The free floating piston is axially moved by a pressurized medium. Piston amplifying structure is provided for regulating the effective mass of the piston and thereby the amplitude and frequency of movement thereof in said cylindrical housing.

5 Claims, 8 Drawing Figures

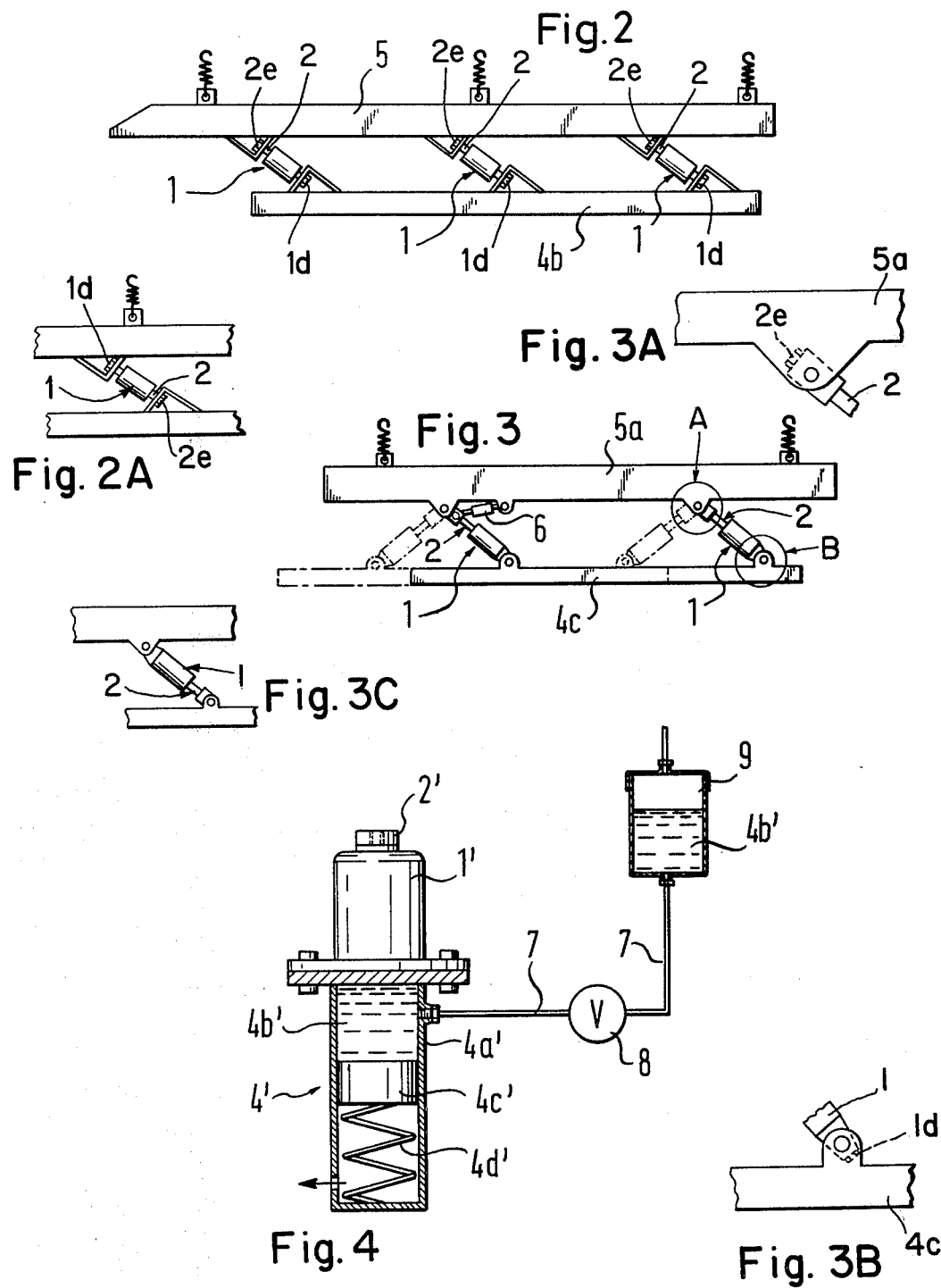

PISTON VIBRATOR

FIELD OF THE INVENTION

This is a continuation of application Ser. No. 832,505, filed Sept. 12, 1977, now abandoned, which is a continuation of 631,063, filed Nov. 12,1975, now abandoned.

This invention relates to a piston vibrator comprising a cylindrical housing with a free floating piston which may be moved axially in a translational manner through a pressurized medium.

BACKGROUND OF THE INVENTION

A piston vibrator of the cited type is known (German laying-open print DOS No. 2,246,571) and has a piston which is automatically controlled via housing and piston channels which may be brought into register as well as a closed cylindrical housing which is designed to be connectable with a structural member part to be vibrated, e.g. moulding sand box, conveyor trough or the like. In the event that the structural member part to be vibrated is mounted in a freely vibrating fashion, e.g. the conveyor trough of a vibrating conveyor, a duo-mass vibrating system whose first mass is the oscillating piston whilst the second mass is formed by the mass of the structural member part to be vibrated added to the mass of the housing which then forms a "dead mass" according to technical terminology, is formed by the translational axial movement of the piston. The already existing discrepancy between the very small piston mass and the mass of the structural member part to be vibrated which is larger than the piston mass by a multiple is increased so that very high vibration frequencies and very small vibration amplitudes result for this structural member part. Such a frequency-amplitude ratio, however, is unfavorable for many applications, e.g. vibrating conveyors, and therefore causes a relatively low efficiency.

Although the vibrational frequency of the afore-quoted known piston vibrators appears to be possible by changing the acting pressure within narrow limits, the proportionality between the piston mass and the obtainable vibrational amplitude which is due to the construction prevents selective regulation thereof to a magnitude which is optimal for the respective application. Thus, in order to attain an increase in the vibrational amplitude with an equal vibrational frequency and equal resonance relationships, a heavier and therefore larger piston, i.e. another oscillator must be used which necessarily will have a larger cylindrical housing and consequently a greater dead weight.

In view of these facts the economical operation of a vibrating conveyor, for example, whose vibrational amplitudes must be compensated for inside wide limits of the respective type and consistency of the materials to be conveyed, necessitates the alternate use of a number of differently dimensioned piston vibrators. Since the pistons and cylinders or cylinder sleeves must be manufactured of high-quality material in expensive processing methods, this results in uneconomically high investment, storage and servicing costs which are increased further by the assembly costs for exchanging the vibrators and the resultant time the vibrating conveyor is out of operation.

These uneconomically high investment and operational expenses are necessarily multiplied when, as is very often the case in conveyor technology, a plurality of piston vibrators of the known construction which engage a structural member or machine part to be vibrated with substantially the same vibrational frequency and vibrational amplitude, i.e. piston vibrators having substantially equal dimensions, have to be associated with such a structural member or machine part. This also prevents a forced synchronization of a plurality of piston vibrators so that phase displacements between the discrete vibrational frequencies are unavoidable and disadvantageously affect the total efficiency of the vibrator group.

It is noted in summary that the afore-described construction of the known piston vibrators designed both with pistons operating against spring or air cushions, i.e. without any impact noises, as well as pistons exerting a hard impact unilaterally or bilaterally against abutments and oftened referred to as vibration hammers, does not only restrict the efficiency, but in particular the application to uneconomically low magnitudes for the individual piston vibrator with specific dimensions.

In conjunction with the afore-mentioned impact piston vibrators, or possibly differential pressure vibrators with step pistons which are driven with greater force during the unilateral impact stroke than during the return stroke, it is also known to connect the wall of the cylindrical housing on the impact side with the structural member part to be vibrated in a rigid manner and with the cylinder jacket in a spring-action manner so that only one share of the cylinder mass constitutes the dead mass. The application of such a piston vibrator designed in this way with a spring-action housing mount, i.e. spring-action counter-flywheel mass, however, is extremely limited, since this can only be taken into consideration for the arrangement of disintegration bases, the walls of filling funnels and the like, but in no case for the drive of elongated conveyor troughs and the like.

Moreover, compressed air tools, e.g. riveting and mortising hammers, boiler scale stripping and rust removal machines possibly comprising automatically controlling step impact pistons, are known which is designed to be conducted out of the cylindrical housing on the impact side and connected on the outer surface either selectively with a tool according to the respective use or flat, vaulted or with serrations according to the purpose. Such vibration tools are not capable of carrying out the function of a vibration drive for conveyor troughs, vibratory sieves or screens, hoppers and the like, however, but merely fulfill a driving function for compressed air tools.

Finally, reference with respect to the prior art is also made to known compressed air oscillators designated in technology terminology very frequently as oscillating cylinders. These are respectively equipped with a piston which may be a two-part piston if desired which hits against limit switches in the dead center areas, thereby being reversed via a regulating valve assembly which also facilitates a selectable adjustment of the pressure acting thereupon for the purpose of separate regulation of the advance and return speeds of the piston. In the case of the subdivision of the piston into two piston halves already mentioned previously, each of the latter is associated with one of two connecting rods which telescope inside one another to selectably adjust the mutual spacing of the piston halves, i.e. a selectable adjustment of the piston stroke lengths with simultaneous adaption of the stroke volume, which are conducted out of the cylindrical housing and are designed to be displaceable and fixable relative to one another with the exception of the latter. A compressed air oscillator which can be adjusted with respect to the stroke lengths and stroke speeds of the piston via a regulating valve assembly controlled by limit switches actuatable by the impact force thereof, however, is associated with great susceptibility to malfunction or brake down, high production costs and servicing costs due to the number of switching and regulating elements and can therefore only be employed in a relatively restricted range of applications where economically feasible.

The object of the present invention is to provide with the lowest possible production expense a robust and consequently reliable piston vibrator of the type cited at the outset which may be manufactured economically and which may be employed in a multifarious range of applications substantially free of repair and servicing and with an optimum efficiency.

This object is accomplished in accordance with the invention in that the piston may be conducted out of the cylindrical housing directly or indirectly in order to vary an amplitude and frequency determining mass variable. Although the piston is conducted out of the cylinder housing in many known piston vibrators as was already mentioned at the outset in the explanations concerning the prior art, this was hitherto taken into consideration only for purposes of driving a compressed air tool. By contrast, the disclosure of the primary inventive conception makes reference for the first time to the possibility of designing the piston with a low mass, e.g. in light construction of plastic, and to utilize the piston part which is conducted out of the cylindrical housing for the following purpose, e.g. to increase this low mass of the piston which serves if desired as the smallest selectable driving variable through mass amplifying elements vibrating together with the piston in operative connection corresponding to the respective use.

In the case of a small surface of such a piston whose mass is variable, the vibrational frequencies and the vibrational amplitudes of the vibrator are almost arbitrarily adjustable without requiring any appreciable construction expenses or even an enlargement of the cylindrical housing for this purpose. This therefore only constitutes a slight dead mass when operatively connected to vibrate together with the structural member part to be vibrated and can therefore be manufactured in light construction if desired, e.g. of plastic. This reason and in particular the selectable adjustability of the amplitude and frequency values of the vibrator causes this to be made available for an almost unlimited range of applications with an optimum efficiency.

This is all the more true, since the disclosure of the primary inventive conception simultaneously opens up the possibility of operatively connecting the piston with the small dimensions or with a low mass as a negligible small dead mass to vibrate to together with the structural member part to be vibrated and to associate with the housing the function of the counter-flywheel mass which is increased if desired in particular in the light construction of the housing by mass amplifying elements selectably secured thereto depending on the desired amplitude and frequency values.

Even in the case of this arrangement of the vibrator as well as in the case of the above-described arrangement with the piston as the counter-flywheel mass capable of being amplified, there is a possibility of utilizing a basic model of the vibrator to accomplish a number of proposed objects, thereby keeping the storage expenses and consequently the investment costs at an economically low level. The conveying capacity of vibrating conveyors, for example, whose conveying speed is a function of the vibratory amplitude can be increased optimally in particular due to the possibility of attaining low vibrational frequencies with large vibrational amplitudes and constant impact force.

In conjunction with the afore-explained possibilities of using the piston vibrator, it is expedient from a structural point of view if the piston conducted out of the housing in the first possibilities for use as quoted hereinbefore is designed with at least one piston mass amplifying element so as to form a mutually vibrating operative connection, or in the second possibility for use, the piston which is conducted out of the housing is designed to be connectable with the structural member part to be vibrated and the housing is designed to be connectable with at least one housing mass amplifying element so as to form a mutually vibrating operative connection. In so doing, the piston vibrator can be adjusted in both alternative uses with the lowest expenditure of work and time merely by selectably setting the mass amplifying elements to the desired amplitude and frequency values.

The afore-described design of the piston vibrator now offers for the first time the possibility of forced synchronization for at least two piston vibrators mutually engaging the structural member part by designing the mass amplifying element, the pistons or the cylindrical housing to form a mutually vibrating operative connection. By means of such a forced synchronization of a plurality of piston vibrators which engage, for example, a large-surface vibrating conveyor in a mutual fashion, the efficiency thereof is increased additionally.

It is particularly advantageous, however, if the mass amplifying element is formed by a flowable material and is enclosed in a cavity which forms a mutually vibrating operative connection with the piston or with the cylindrical housing. The cavity can be adapted for example to be charged selectably with the flowable material via a regulating valve assembly; if desired it is connected to at least one source of pressurized liquid and includes a counterpressure means with variable volume for the flowable material. On the basis of these measures which can be realized with a relatively low cost of construction, it is possible for the first time to adjust the piston vibrator in a selectable way during operation with respect to the vibratory amplitude and vibratory frequency.

Since the flowable mass material, e.g. mercury, water or a similar liquid, must form a compact vibrating mass during operation of the vibrator, it is advantageous if the cavity is designed to have a cylindrical shape and is equipped with a piston separating the flowable material from the counterpressure means, e.g. a spring or other resilient means. The pressure source for the flowable material may consist of a pressure tank which is stationary and spaced apart from the piston vibrator, i.e. it does not vibrate together with it, from which the flowable material may be injected by compressed air or other pressurizing means e.g. a pump, pressure screw or the like, through flexible pressure lines and the regulating valve assembly into the cavity which may consist, example, of a pressure cylinder connected with the piston or with the cylindrical housing or which may be hollowed out in the piston itself. As soon as the flowable material in the cavity has been injected with the material weight, i.e. the required mass, necessary for the sought amplitude and frequency values of the oscillator, said required mass being a function of the excess pressure prevailing in the pressure tank, the connection of the pressure lines between the container and the cavity may be closed by means of the regulating valve assembly.

An additional expansion of the range of applications of the piston vibrator is achieved in that the cylinder-piston unit thereof is designed to be angularly adjustable with respect to the axis direction thereof relative to the structural member part, even relative to the mass amplifying element if desired, thereby rendering even the direction of vibration of the piston vibrator selectably adjustable, for example to change or reverse the direction of conveyance of a vibrating conveyor, preferably by means of a regulating means, if desired with remote control, which is associated with the cylinder-piston unit and which engages both the latter as well as the structural member part or the mass amplifying element.

BRIEF DESCRIPTION OF THE DRAWINGS

Embodiments of the invention will now be explained in more detail in the following with reference to the enclosed drawings, in which:

FIGS. 2 and 3 are each a lateral schematic elevation of a vibrator assembly for mutual engagement on part of a structural member, FIG. 2A illustrates a further selective positioning of the vibrator, FIGS. 3A and 3B illustrate enlarged showings of the encircled portions A and B, respectively, in FIG. 3 and illustrating in broken lines the connection between the piston and the structural member and the connection between the cylinder housing and a mass amplifying element, FIG. 3C illustrates a further selective positioning of the vibrator, and FIG. 4 is a lateral schematic elevation, partially illustrated in sectional view, of an ancillary means for the operation of the piston vibrator.

DETAILED DESCRIPTION

Figure 1:
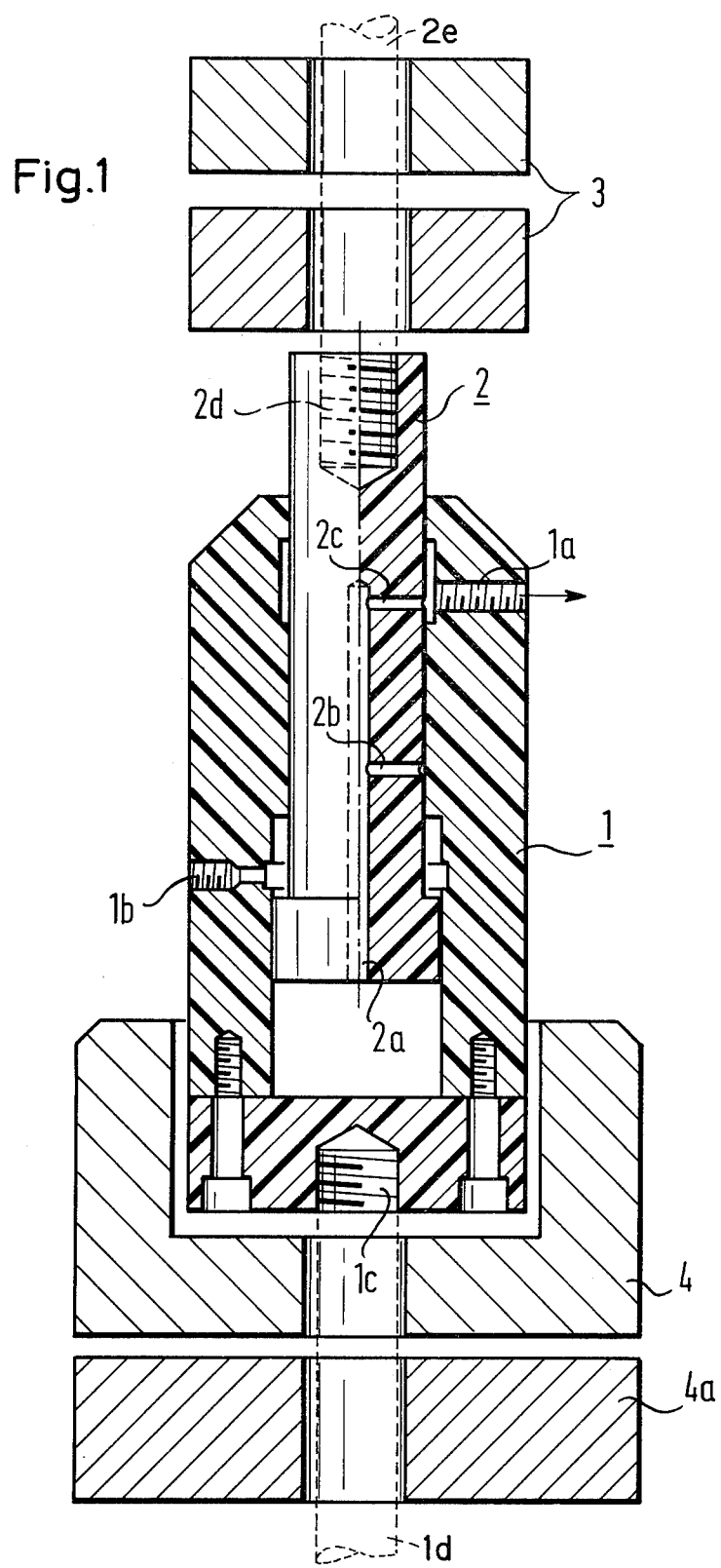
FIG. 1 is an axial section through a piston vibrator of the type described hereinbefore.

A piston vibrator in accordance with FIG. 1 comprises a cylindrical housing 1 with a free floating step piston 2 whose step of smaller cross section is conducted axially out of the housing 1. Both in the latter as well as in the piston 2 itself, channels 1a, 1b or 2a, 2b, 2c are hollowed out in a known manner such that the piston 2 may be set in translational axial movement with automatic reversal at the dead centers, i.e. in axial vibrational movement, by causing a pressurized medium, e.g. pressurized air, to act upon it via the housing channel 1b.

The end of the piston 2 which is conducted out of the housing 1 is designed with at least one piston mass amplifying element 3 shown in FIG. 1, e.g. by means of a threaded bore 2b hollowed out on the front side of the projecting piston end as well as a screw bolt 2e indicated by broken lines, so as to form a mutually vibrating operative connection.

By contrast or in addition thereto, the housing 1 may also be designed as is shown also in FIG. 1 with at least one housing mass amplifying element 4,4a illustrated in FIG. 1, e.g. by means of a threaded bore 1c hollowed out externally on the closed face of the housing as well as a screw bolt (indicated by broken lines), so as to form a mutually vibrating operative connection.

The cylinder-piston unit 1,2 may be connected either on the housing side or on the piston side according to FIG. 2 with part of a structural member to be vibrated, e.g. a reciprocating-plate feeder 5 which may be associated as illustrated with two or more piston vibrators or cylinder-piston units 1,2 which mutually engage in groups.

In the case of the embodiment in accordance with FIG. 2, a housing mass amplifying element or a structural member defining the aforesaid "dead mass" 4b is provided which forms a mutually vibrating connection with the cylindrical housing 2 of the vibrator group.

Also in the embodiment according to FIG. 3 two vibrators or cylinder-piston units 1,2 engage part of a structural member 5a on the piston side and form a mutual vibrating operative connection on the housing side through a housing mass amplifying element or a structural member defining the aforesaid "dead mass" 4c, but are disposed at an adjustable angle with respect to the cylinder axis both relative to the latter as well as relative to the part of the structural member 5a.

In order to facilitate angular adjustment of the vibrators 1,2 during operation thereof, a regulating device, e.g. at least one remote-controlled pressure cylinder 6, is provided which is articulated on the one hand on a respective one of the associated cylinder-piston units 1,2 and on the other hand either on the structural member part 5a as is illustrated, but which may also engage the housing mass amplifying element 4c which is not illustrated.

A piston vibrator is shown on a reduced scale in FIG. 4 which comprises a cylindrical housing 1' and a piston 2' conducted out of the latter with respect of which a mass amplifying element 4' is secured to the cylindrical housing 1'. This mass amplifying element may be changed with respect to its inherent mass, designed, for example, in the shape of a pressure clyinder 4a' whose cavity can be charged via a pressurized line system 7 and a regulating valve assembly 8 from a pressure tank 9 with a selectable volume of a flowable material 4b' e.g. water, mercury or the like.

A spring 4d' which prevents the penetration of the flowable material 4b' via a separating piston 4c' mounted to be axially displaceable in the cylinder cavity or any other counterpressure means is disposed in the cavity of the pressure cylinder 4a.

The invention is not limited to the embodiments illustrated in the drawing. For instance, it would be possible by way of example to design the piston to be single-step and/or abut on the inner sides at at least one of the cylinder walls. For this purpose, stroke-arresting stops, if desirable adjustable, could be passed on the piston or cylinder side, for example, through the cylinder wall and regulating screws designed to be actuatable from the outside thereof could be provided. Likewise, for the inclusion of the flowable material to change the inherent mass of the mass amplifying element 4' on both sides of the separating piston 4c', it would also be feasible to connect the cavity via pressure lines and a correspondingly designed regulating valve assembly with one of two pressure tanks 9 or other sources of pressurized liquid of differing specific liquid weight such that the counterpressure means for the flowable material is also an incompressible flowable material but of a different specific weight. Furthermore, it could also be considered to hollow out the cavity for the inclusion of the flowable material in the piston itself so that this would then constitute the mass amplifying element alone. Furthermore, the piston could be conducted out of the cylindrical housing 2 only directly, e.g. via an associated piston or connecting rod, not only unilaterally but bilaterally directly or indirectly for the purpose of influencing a frequency or amplitude modulated vibratory mass variable if constructive circumstances indicate that this is expedient or necessary. Furthermore it is not necessary in that case to design the piston and/or cylindrical housing to be connectable with a mass amplifying element if only a very small driving variable is required as was already stated previously in conjunction with the piston.

The piston vibrator may also be used for a resonance coupling of two masses, e.g. a conveyor trough, a reciprocating screen or sieve or the like comprising a fundament or counterflywheel mass which may be mounted for spring action if desired. By so doing, a conveyor trough, for example, which is to be vibrated and which is mounted with guide springs or other guides on a fundament, could be driven.

The embodiments of the invention in which an exclusive property or privilege is claimed are defined as follows:

1. In a piston vibrator for connection to a structural member to cause a vibration thereof comprising a cylindrical housing having a chamber with a free floating piston therein which is axially movable in a translational manner by a pressurized medium, the improvement comprising at least one of said piston and said cylinder housing being made of a lightweight material, first coupling means on said piston and second coupling means on said cylindrical housing, and mass amplifying means, said first coupling means being selectively connected to one of said structural member and said mass amplifying means, said second coupling means being selectively connected to the other of said structural member and said mass amplifying means, said piston vibrator being changeable end for end so that when said mass amplifying means is connected to said piston by said first coupling means, said second coupling means effects a coupling of said cylindrical housing to said structural member to thereby effect a selective regulating of the effective mass of said piston and thereby the amplitude and frequency of relative movement between said cylindrical housing and said piston, and when said mass amplifying means is connected to said cylindrical housing by said second coupling means, said first coupling means effects a coupling of said piston to said structural member to thereby effect a selective regulating of the effective mass of said cylindrical housing and thereby the amplitude and frequency of relative movement between said cylindrical housing and said piston, whereby a first range of selection of the amplitude and frequency of vibratory movement is selective for said structural member, said mass amplifying means and said piston connected together and a second range of selection of the amplitude and frequency of vibratory movement is selective for said structural member, said mass amplifying means and said cylindrical housing connected together.

2. The improved piston vibrator according to claim 1, wherein said cylinder housing and said piston are angularly connected with respect to the axis direction thereof relative to said structural member.

3. The improved piston vibrator according to claim 1, including passageway means in said piston and in said cylindrical housing for effecting an automatic reversal of said relative movement between said piston and said cylindrical housing adjacent the end of the stroke thereof.

4. The improved piston vibrator according to claim 1, wherein both of said piston and said cylindrical housing are made of a lightweight material.

5. The improved piston vibrator according to claim 1, including a plurality of said improved piston vibrators connected to said structural member, said mass amplifying means being a common mass member interconnecting the end of said piston vibrators remote from said structural member.

* * * * *

UNITED STATES PATENT AND TRADEMARK OFFICE
CERTIFICATE OF CORRECTION

PATENT NO. : 4 256 014
DATED : March 17, 1981
INVENTOR(S) : Dietrich Kröger

It is certified that error appears in the above—identified patent and that said Letters Patent is hereby corrected as shown below:

On the title page and immediately below "[22] Filed: Feb. 5, 1979", insert the following:

---Foreign Application Priority Data

Nov. 12, 1974 [DE] Fed. Rep. of Germany ..... 2453593. ---.

Signed and Sealed this

Twentieth Day of October 1981

[SEAL]

*Attest:*

GERALD J. MOSSINGHOFF

*Attesting Officer*    *Commissioner of Patents and Trademarks*